(12) United States Patent
Stubler et al.

(10) Patent No.: US 6,804,684 B2
(45) Date of Patent: Oct. 12, 2004

(54) METHOD FOR ASSOCIATING SEMANTIC INFORMATION WITH MULTIPLE IMAGES IN AN IMAGE DATABASE ENVIRONMENT

(75) Inventors: Peter O. Stubler, Rochester, NY (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 256 days.

(21) Appl. No.: 09/850,475

(22) Filed: May 7, 2001

(65) Prior Publication Data

US 2002/0188602 A1 Dec. 12, 2002

(51) Int. Cl.⁷ .................................................. G06F 7/00
(52) U.S. Cl. .................. 707/104.1; 707/102; 707/3; 382/190
(58) Field of Search ............................. 707/3, 5, 102, 707/104.1; 382/180–182, 190, 206, 219, 175; 715/512

(56) References Cited

U.S. PATENT DOCUMENTS

| | | | | |
|---|---|---|---|---|
| 5,404,295 A | | 4/1995 | Katz et al. ............. 364/419.19 |
| 5,493,677 A | * | 2/1996 | Balogh et al. ........... 707/104.1 |
| 5,517,605 A | | 5/1996 | Wolf ......................... 395/155 |
| 5,579,471 A | | 11/1996 | Barber et al. ............... 395/326 |
| 5,852,823 A | | 12/1998 | De Bonet ................... 382/162 |
| 5,893,101 A | * | 4/1999 | Balogh et al. ............. 707/100 |
| 5,901,245 A | | 5/1999 | Warnick et al. ............. 382/190 |
| 5,930,783 A | * | 7/1999 | Li et al. ..................... 707/1 |
| 6,115,717 A | | 9/2000 | Mehrotra et al. ........... 707/102 |
| 6,182,069 B1 | * | 1/2001 | Niblack et al. ................ 707/6 |
| 6,240,423 B1 | * | 5/2001 | Hirata ..................... 707/104.1 |
| 6,353,823 B1 | * | 3/2002 | Kumar ......................... 707/3 |
| 6,427,032 B1 | * | 7/2002 | Irons et al. ................. 382/306 |
| 6,463,426 B1 | * | 10/2002 | Lipson et al. .................. 707/3 |
| 6,463,444 B1 | * | 10/2002 | Jain et al. ................. 707/104.1 |
| 6,549,922 B1 | * | 4/2003 | Srivastava et al. .......... 707/205 |
| 6,563,959 B1 | * | 5/2003 | Troyanker .................. 382/282 |
| 2002/0055955 A1 | * | 5/2002 | Lloyd-Jones et al. ....... 707/512 |

OTHER PUBLICATIONS

U.S. patent application Ser. No. 09/223,860, Luo et al., filed Dec. 31, 1998.
U.S. patent application Ser. No. 09/291,857, Zhu et al., filed Apr. 14, 1999.
U.S. patent application Ser. No. 09/450,190, Luo et al., filed Nov. 29, 1999.
U.S. patent application Ser. No. 09/685,112, Lieberman et al., filed Oct. 10, 2000.
"The Image Processing Handbook", 2nd ed., by John C. Russ. CRC Press, 1995, pp. 259–262.
"Eigenfaces for Recognition" by Matthew Turk and Alex Pentland. Journal of Cognitive Neuroscience, vol. 3, No. 1, 1991, pp. 71–86.

(List continued on next page.)

Primary Examiner—Greta Robinson
Assistant Examiner—Miranda Le
(74) Attorney, Agent, or Firm—David M. Woods

(57) ABSTRACT

A method of generating captions or semantic labels for an acquired image is based upon similarity between the acquired image and one or more stored images that are maintained in an image database environment, where the stored images have preexisting captions or labels associated with them. The method includes the steps of: a) acquiring an image for evaluation with respect to the stored images; b) automatically extracting metadata from the acquired image without requiring user interaction in the image database environment; c) automatically selecting one or more stored images having metadata similar to the extracted metadata, thereby providing selected stored images with metadata similar to the acquired image; and d) generating captions or labels for the acquired image from the preexisting captions or labels associated with the selected stored images.

28 Claims, 7 Drawing Sheets

OTHER PUBLICATIONS

"A Real–Time Face Tracker" by Jibe Yang and Alex Waibel. Third IEEE workshop on Applications of Computer Vision WACV '96. Sponsored by IEEE Computer Society Technical Committee on Pattern Analysis and Machine Intelligence (PAMI), Dec. 2–4, 1996, pp. 142–147.

"Comparing Images Using Color Coherence Vectors" by Greg Pass, Ramin Zabih, and Justin Miller. Proceedings ACM Multimedia 96, Boston, MA, Nov. 18–22, 1996. Sponsored by the ACM Special Interest Groups. SIGCOMM, SIGGRAPH, SUGMULTIMEDIA, and SIGMIS. pp. 65–73.

"Multimedia Information Exploration" by Allan Kuchinsky. CHI98 Workshop on Information Exploration, FX Palo Alto Laboratory, Inc. Palo Alto, CA, 1998.

"Example–Based Learning for View–Based Human Face Detection" by Kah–Kay Sung and Tomaso Poggio. IEEE Transactions on Pattern Analysis and Machine Intelligence, vol. 20, vol. 1, Jan. 1998.

"Algorithms for Clustering Data" by Anil K. Jain and Richard C. Dubes. Prentice Hall, 1988, pp. 55–60, 89–92, 133–135.

* cited by examiner

METHOD FOR ASSOCIATING SEMANTIC INFORMATION WITH MULTIPLE IMAGES IN AN IMAGE DATABASE ENVIRONMENT

FIELD OF THE INVENTION

The invention relates generally to the field of digital image processing, and in particular to a method for associating captions or semantic information with images in an image database environment.

BACKGROUND OF THE INVENTION

Currently, content-based image retrieval in an image database environment is commonly practiced by searching for images that are similar to the query based upon low-level features, or based upon semantic labels. Low-level features commonly include attributes such as colors or textures found within the image. Non-image based metadata associated with the image can also be used, such as time/date and location, but by far the most user-friendly method of determining similarity is by using caption information or semantic labels applied to the images. Potentially, of course, all of the images could be annotated with caption text or semantic labels, stored in a relational database and retrieved by keyword. However, until computer processing reaches the point where images can be automatically and effectively analyzed, most automatic image retrieval will depend on captions or semantic labels manually attached to specific images. Unfortunately, while friendly to the user for retrieval, the application of captions or semantic labels to an image is a labor-intensive process that is often not performed. Moreover, even if the images can be automatically interpreted, many salient features of images exist only in the mind of the user and need to be communicated somehow to the machine in order to index the image. Therefore, the application of captions or semantic labels to images, based on some degree of user involvement, will remain important for the foreseeable future.

It has been recognized that the home of the future may be awash with digital media and that there will be major challenges in organizing and accessing this media information. In that connection, more effective information exploration tools could be built by blending cognitive and perceptual constructs. As observed by A. Kuchinsky in the article, "Multimedia Information Exploration", *CHI98 Workshop on Information Exploration*, FX Palo Alto Laboratory, Inc.: Palo Alto, Calif. (1998), if narrative and storytelling tools were treated not as standalone but rather embedded within a framework for information annotation and retrieval, such tools could be leveraged as vehicles for eliciting metadata from users. This article recognizes that there is an emerging set of technologies for content-based indexing and retrieval, which provide some degree of automation for this process by automatically extracting features, such as color or texture, directly from visual data. However, in many of these systems, the features extracted tend to be low-level syntax features that are represented through image analysis, which may not be as personally meaningful to consumers as keyword-based attributes are.

Consequently, there has been work in developing a user interface agent in facilitating, rather than fully automating, the textual annotation and retrieval process in connection with typical uses of consumer picture-taking. The role of the agent would lie not so much in automatically performing the annotation and retrieval but in detecting opportunities for annotation and retrieval and alerting the user to those opportunities. Preferably, the user interface agent would assist a user by proactively looking for opportunities for image annotation and image retrieval in the context of the user's everyday work. For instance, in commonly-assigned, co-pending U.S. patent application Ser. No. 09/685,112, entitled "An Agent for Integrated Annotation and Retrieval of Images" and filed Oct. 10, 2000, a method for integrated retrieval and annotation of stored images (in a database) involves running a user application (e.g., an e-mail application) in which text entered by a user is continuously monitored by an annotation and retrieval agent to isolate the context expressed by the text. The context is matched with metadata associated with the stored images, thereby providing one or more matched images, and the matched images are retrieved and displayed in proximity with the text.

While the intent in Ser. No. 09/685,112 is to insert selected ones of the matched images into the text, the context is also utilized to provide suggested annotations to the user for the matched images, together with the capability of selecting certain of the suggested annotations for subsequent association with the matched images. If the desired image has not yet been annotated, as would be the case if the images were new images being loaded for the first time, the annotation and retrieval agent proposes candidate keywords from the surrounding text so that the user can select one or more appropriate keywords to annotate, and store with, the new image. However, this technique depends upon user-entered text for its source material for annotations, and in the absence of such text cannot be used to provide annotations for collections of images.

In order to facilitate the retrieval of relevant material from a large database, it is known to annotate selected subdivisions of the database, such as paragraphs, columns, articles, chapters or illustrative material such as pictures, charts, drawings and the like. In U.S. Pat. No. 5,404,295 ("Method and Apparatus for Utilizing Annotations to Facilitate Computer Retrieval of Database Material"), these annotations may be generated manually, semiautomatically or automatically. Generally, these annotation techniques involve finding some keyword-based relationship between the current subdivision and a prior subdivision and either utilizing the annotations for the prior subdivision, as suitably modified for the current subdivision (automatic mode) or displaying the modified annotations to the annotator as proposed annotations with the annotator making selections from the annotations (semiautomatic annotation). As described in this patent, the annotations are in a natural language form, which may be translated into a structured form, such as a T-expression. This means that a large number of alternative natural language queries, once translated into structural forms, will match the structured forms produced by a small number of annotations, thus facilitating searching. Besides the usual requirement of a relatively time-consuming initial annotating process, the drawback of these techniques is the necessity of manually assigning some form of keyword to the current subdivisions, which establishes the needed relationship between the current subdivision and a prior subdivision.

The prior art has been mainly directed to simplifying the annotation task for the purpose of image retrieval. In particular, it has not been devoted to the problem of simplifying the task of organizing large groups of similar pictures, that is, the task of constructing picture albums in a database environment. What is needed is a method that would assign, or at least recommend, captions or semantic labels to several images simultaneously based upon low-level objectively measurable similarities between the images. Ideally, these captions or semantic labels could independently apply to the whole image (global captions or labels) or to distinguishable parts of the image (regional captions or labels). This assignment should happen either automatically, or with limited user interaction, thereby decreasing the effort required of the user. Notwithstanding their utility in the organization of picture albums, these captions or semantic labels can subsequently be used as powerful tools for the storage, retrieval, and management of digital images within a digital image database environment.

SUMMARY OF THE INVENTION

The present invention is directed to overcoming one or more of the problems set forth above. Briefly summarized, according to one aspect of the present invention, a method of generating captions or semantic labels for an acquired image is based upon similarity between the acquired image and one or more stored images that are maintained in an image database environment, where the stored images have preexisting captions or labels associated with them. The method includes the steps of: a) acquiring an image for evaluation with respect to the stored images; b) automatically extracting metadata from the acquired image without requiring user interaction in the image database environment; c) automatically selecting one or more stored images having metadata similar to the extracted metadata, thereby providing one or more selected stored images with metadata similar to the acquired image; and d) generating one or more captions or labels for the acquired image from one or more preexisting captions or labels associated with the selected stored images.

In a further aspect of the invention, a plurality of images are acquired for evaluation with respect to the stored images and metadata is automatically extracted from the acquired images without requiring user interaction in the image database environment. Then the acquired images are clustered into groups based upon similarities in their metadata, thereby resulting in grouped images with similar metadata; one or more stored images are selected having metadata similar to the extracted metadata, thereby providing selected stored images with metadata similar to the grouped images; and captions or labels are generated for grouped images from the preexisting captions or labels associated with the selected stored images.

This invention describes a method to assign captions or semantic labels to several images simultaneously based upon low-level objectively measurable similarities between the images. The advantage of this assignment is that it happens either automatically, or with limited user interaction, thereby decreasing the effort required of the user. A further advantage is that these semantic labels can subsequently be used as powerful tools for the storage, retrieval, and management of digital images within a digital image database environment. In a preferred embodiment, such automatic assessment will be provided at an image region level. While the measurements and region identification is derived from low-level features, the processing (including knowledge based operations) may yield a region with a mixture of high-level feature description (clear sky, cloudy sky, mixed sky) and low-level features (color representation, area coverage, location). Similarities between such regions would be calculated on the basis of a combination of high-level and low-level features.

This invention uses one or more objectively measurable low-level features or derived higher level features that are found within the image regions, or are associated with the image regions, to find similarities between them. Similar unlabeled image regions are presented to the user so that the user may apply a caption or semantic label to all of the regions simultaneously. An association between the semantic label and the underlying similar feature(s) is maintained to facilitate the subsequent automatic extension of these labels based upon similar features. If images are being added to an existing database and similarities are found between (unlabeled) regions of the new images and labeled regions within the existing database, these labels may be extended to the unlabeled set. This extension may happen automatically or with some verification by the user.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing methods employing database management and retrieval are well known, the present description will be directed in particular to attributes forming part of, or cooperating more directly with, the method in accordance with the present invention. Aspects of the method that are not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, the software needed for implementation of the method is within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

This invention uses image similarity based upon objectively measurable or determinable metadata to provide a mechanism for assigning captions or semantic labels to multiple images simultaneously, and to automatically assign these captions or labels to new images based upon shared metadata, thereby reducing the effort required of the user. Typical metadata includes low-level measurable features such as color and texture or image-accompanying data such as date and time of capture. In a preferred embodiment, such automatic assessment will be provided at an image region level. For the purpose of this description, the term "image region" will be used when referring to areas of an image that correspond to a significant characteristic low-level feature, such as "sky" or "grass". These regions may encompass all or part of the image in which they are found. While the measurements and region identification is derived from low-level features, the processing (including knowledge based operations) may yield a region with a mixture of high-level feature description (clear sky, cloudy sky, mixed sky) and low-level features (color representation, area coverage, location). Similarities between such regions would be calculated on the basis of a combination of high-level and low-level features.

Figure 1:
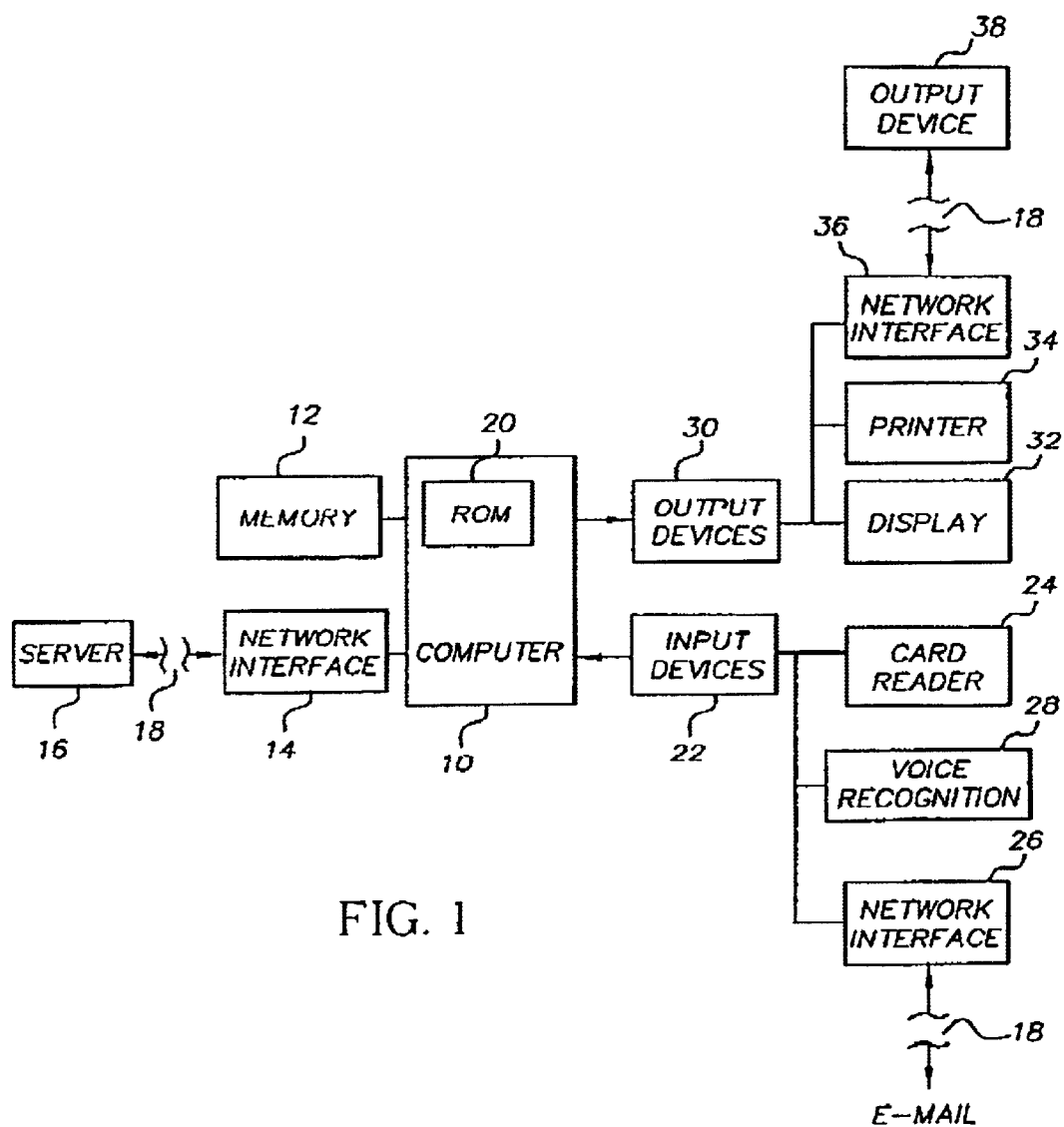
FIG. 1 is a block diagram of a computer system for implementing the present invention.

Referring to the figures for a more detailed understanding of the invention, FIG. 1 shows a computer system which might be utilized to practice the invention. The system includes a computer 10, which may be any of a variety of standard computers or data processors. The size and capability of the computer may vary to some extent with the size of database being accessed, and also with respect to the speed which may be required of the processor to perform the various operations. While for purposes of the following description it is assumed that the same computer 10 is being utilized both to assign captions or semantic labels to new images based upon shared metadata, e.g., low-level features, and to search the database, this is not intended as a limitation in the invention. For instance, it should be well understood that separate processors may be utilized for the assignment of labels (e.g., a desktop PC) and the searching of the database (e.g., a remote server connected to the desktop PC via the Internet).

The computer 10 includes a large capacity memory 12 in which the database to be searched is stored. Alternatively, or in addition to the memory 12, the computer 10 may interconnect via a network interface 14 with a remote server 16 in which the database is stored. The interconnecting network 18 could be, e.g., a dedicated network or a public network, such as the Internet. These memories may be any kind of large capacity memories, such as various types of high volume hard magnetic, or optical, disk drives. The computer 10 further includes internal memory 20, such as a ROM, which would typically store the software for implementing the inventive method as described herein. Memories 12 and 20 may be separate memories, or may be various sections of the same storage device.

A number of standard input devices 22 may be available for providing information and data to the computer 10. These devices may include without limitation a keyboard device, a mouse, an image scanner or the like. Particular input devices of note include a memory card reader 24 for acquiring images from a memory card, and a network interface 26 for acquiring images from a network source, such as e-mail, through the interconnecting network 18. An optional input device is a voice recognition module 28, which may be utilized to input captions or semantic information into the system, or to correct captions or semantic information extended to new images.

A number of standard output devices 30 may also be connected to the computer, such as a display device 32, a printer 34, and an output device 38 connected through the interconnecting network 18 to a network interface 36. While shown separately for purposes of discussion, it would be understood that the network interfaces 14, 26 and 36 may be the same, or various aspects of the same, interface. Newly captioned and labeled images could also be sent to the database memory 12 or to the server 16 for indexing and storage.

Figure 2:
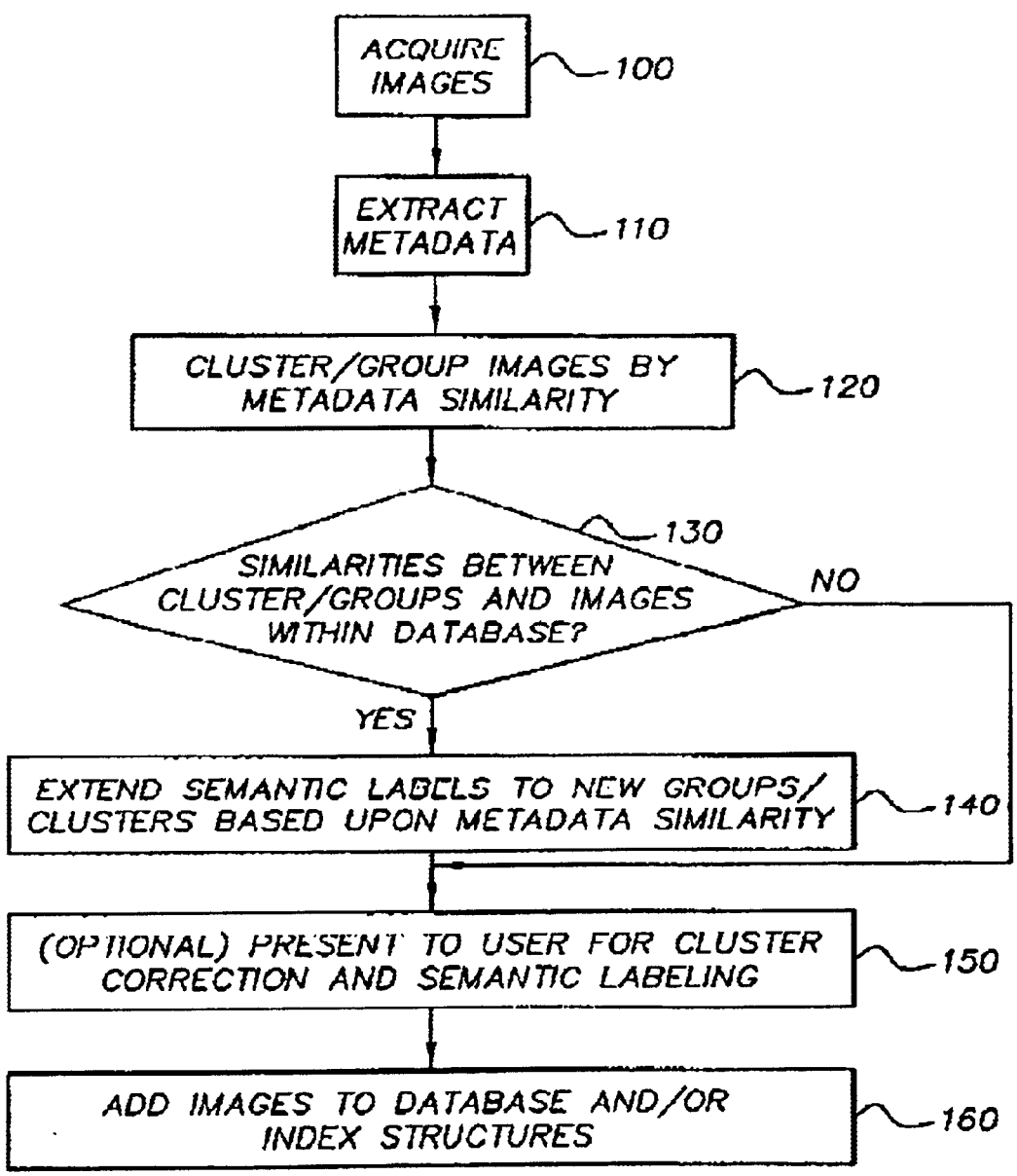
FIG. 2 is a diagram of the overall method for implementing the invention.

FIG. 2 illustrates an overview of the method and system in accordance with the invention. Initially, images are acquired (100), e.g., from a digital source such as the card reader 24 or the network interface 26, and metadata is extracted (110) from certain features in or related to the images. These features may include without limitation color, composition, color texture, time and date information, the presence and distribution of open space, or any other objectively measurable feature. As the term is used in the preferred embodiment, metadata includes image data that can be objectively measured or determined (hence called low-level data); while this data ordinarily represents objective attributes that can be extracted through image analysis or from predetermined accompanying data (e.g., date/time), metadata may also include higher level semantic data, which corresponds to cognition and represents the information in terms that are personally meaningful to the user. While it may be at the present time difficult to reliably measure many forms of semantic data, certain semantic features, such as the perception of sky or open space may be determined. More specifically, such higher level semantic data (e.g., faces, clear sky, cloudy sky, mixed sky) would be derived from lower level data (e.g., flesh color, sky color and distribution, open space).

In the preferred embodiment, the metadata can be categorized into three classes of information: (1) capture metadata that is provided generally at the time of capture by the capture device: (2) global metadata that is objectively derived from the whole image; and (3) region metadata that is objectively derived from a region in the image. Well-known forms of capture metadata include time/date provided by the capture device, global positioning (GPS) data if available from the capture device, event codes entered by the user (e.g., a caption like "birthday" entered in, e.g., an APS film camera and imprinted on the film and/or an associated magnetic layer), and the like. Global metadata includes whole image measurements based upon color histograms, texture features, and the like, which are well known in the art. It also includes whole image distinctions, such as indoors or outdoors, which may be determined by a number of known algorithms. For instance, the use of color histograms and color coherence vectors for image comparison is described in G. Pass, R. Zabih and J. Miller, "Comparing Images Using Color Coherence Vectors", *Proc. ACMMultimedia* 96, November, 1996, pp. 65 –73 and various estimators of texture are described in J. C. Russ, *The Image Processing Handbook,* 2nd Edition, CRC Press: 1995, pp. 259 –262.

Region metadata includes such detected regional features as face, skin, sky, grass, open space, background vs. foreground, and the like. Various well-known techniques may be used to detect region metadata. For instance, a typical face detection method is described in K. K. Sung and T. Poggio, "Example-based Learning for View-based Human Face Detection", *IEEE Pattern Analysis and Machine Intelligence,* 20(1), 39 –51, January, 1998. A typical model for representing skin color in a chromatic space utilizing histogram analysis is described in an article by J. Yang and A. Waibel, "A Real-time Face Tracker," *Proceedings of Third IEEE Workshop on Applications of Computer Vision, WACV* 1996, pp. 142 –147. For the detection of semantic regions such as sky, an appropriate method is described in U.S. patent application Ser. No. 09/450,190, entitled "Method for Detecting Sky in Images" and filed Nov. 29, 1999 in the names of J. Luo and S. Etz. The detection and utilization of open space is taught in commonly-assigned U.S. Pat. Nos. 5,901,245 and 6,115,717. Background and foreground may be determined by identifying the main subject, which may be located by the algorithm described in commonly-assigned, copending U.S. patent application Ser. No. 09/223,860, entitled "Method for Automatic Determination of Main Subjects in Photographic Images" and filed Dec. 31, 1998 in the names of J. Luo, S. Etz and A. Singhal. Each of these references, patents and patent applications are incorporated herein by reference.

Acquired images are clustered or grouped by metadata similarity (120) based upon one or more of the foregoing objectively measurable or determinable features. Cluster analysis organizes data by abstracting underlying structure either as a grouping of individuals or as a hierarchy of groups. Typical clustering techniques are described in A. K. Jain and R. C. Dubes, *Algorithms for Clustering Data*, Prentice-Hall: 1988, particularly pp. 55–60, 89–92 and 133–135. Once the data is clustered or grouped, the presence of any similarities are evaluated (130) between the clusters and groups and the images within the database, or between the labeled regions of the clusters and groups and labeled regions of images within the database. This evaluation may be based upon event similarity (e.g., date/time), global similarity (e.g., color or texture) or region similarity (e.g., faces).

A common approach to searching a database for similarities is to compare a query image with the images in the database using their feature-based representation by means of distance functions (see U.S. Pat. No. 5,579,471, R. J. Barber et al., "Image query system and method"; U.S. Pat. No. 5,852,823, J. S. De Bonet, "Automatic image classification and retrieval system from database using query-by-example paradigm"). Such techniques typically represent an image in terms of its depictive features, such as color or texture. While these techniques may be used in the present invention, a potential shortcoming is that no distinction is made between perceptually significant and insignificant image features in the image representation and matching schemes. Consequently, in the preferred embodiment, this shortcoming is overcome by representing an image in terms of its perceptually significant features. Thus, similarity of two images becomes a function of the similarity of their perceptually significant features. This technique utilizing perceptually significant visual similarity is described in commonly-assigned, copending U.S. patent application Ser. No. 09/291,857, entitled "Perceptually Significant Feature-based Image and Retrieval", which was filed Apr. 14, 1999 in the names of W. Zhu and R. Mehrotra, and which is incorporated herein by reference.

According to Ser. No. 09/291,857, color feature-based representation of an image is based on the assumption that significantly sized coherently colored regions of an image are perceptually significant. Therefore, colors of significantly sized coherently colored regions are considered to be perceptually significant colors. Therefore, for every input image, its coherent color histogram is first computed, where a coherent color histogram of an image is a function of the number of pixels of a particular color that belong to coherently colored regions. A pixel is considered to belong to a coherently colored region if its color is equal or similar to the colors of a pre-specified minimum number of neighboring pixels. Furthermore, according to Ser. No. 09/291,857, texture feature-based representation of an image is based on the assumption that each perceptually significantly texture is composed of large numbers of repetitions of the same color transition(s). Therefore, by identifying the frequently occurring color transitions and analyzing their textural properties, perceptually significant textures can be extracted and represented. For further details, reference should be made to Ser. No. 09/291,857.

For other types of metadata, the data may already be represented in a form suitable for clustering. For instance, in the preferred embodiment time/date information is used and may be directly subjected to cluster analysis. In other cases, for example that of region metadata, the data may need to be processed for similarity by known algorithms. As an example, determination of facial similarity is described in M. Turk and A. Pentland, "Eigenfaces for Recognition", *J. Cognitive Neurosci.* 3(1)1991.

The images in the database will have preexisting captions or semantic labels associated with them. These captions and semantic labels may have been derived from the instant process, as previously applied to acquired images that are now stored in the database, or from some other process, including manual annotation. If similarities are found (130) between the acquired images and the database images, then the preexisting captions or semantic labels from the matched clusters and groups in the database are extended (140) to the acquired images. An association may be maintained between the caption or semantic label and the underlying similar low level feature to facilitate the automatic extension of captions or semantic labels for new images. For example, if a group of images is similar by time/date then the applied caption or semantic label may relate to the event. Alternately, a group of images clustered by visual similarity may share a caption or semantic label that is more likely to be related to the image content. Thus, a new acquired image sharing a similar date/time to previously labeled images (regions) in the database, but not sharing visually similar content, would have only the date/time associated captions or semantic labels extended to it.

An optional feature is to present (150) the extended captions or semantic labels for the new clusters or groups to the user for verification of the extended captioning or semantic labeling, or for cluster correction or modification; otherwise, the captioning or semantic labeling will be automatically extended (140) to the acquired images. If a hierarchical clustering method is employed (see A. K. Jain and R. C. Dubes, op.cit., pp. 58 –88), the group of images may be presented through a tree mechanism. Each level of the hierarchy may be represented by a single image. The user may be allowed to rearrange the clusters to correct any erroneously associated images. The user may then assign captions or semantic labels to the resultant groups at any level of the hierarchy with the caption or label being applied to each member of the group. Finally, the images are added (160) to the database and/or its index structure.

Figure 3:
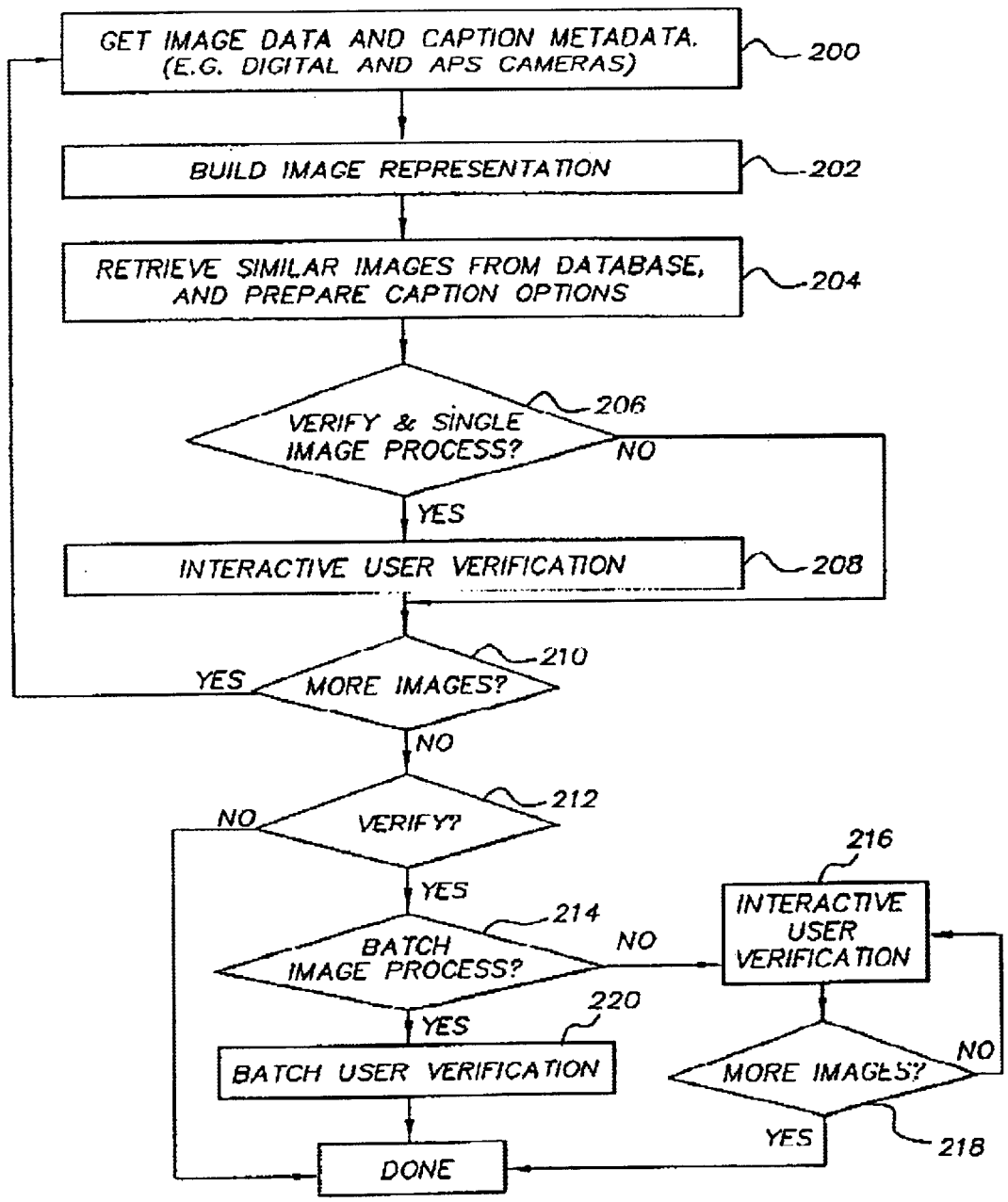
FIG. 3 is a detailed flow chart of a preferred embodiment of the invention shown in FIG. 2.

FIG. 3 shows a preferred implementation of the method and system shown in FIG. 2. After acquiring the image data and extracting (200) any capture metadata that may have been obtained by the capture device, the image representation is built (202) from the global and region metadata. This will be further explained in relation to FIG. 4. After the image representation is built, a search of the database is performed, and similar images are retrieved (204) from the database, and a set of caption or semantic label options are prepared. The retrieval and preparation stage 204 will be further explained in relation to FIG. 5. If it is desired to verify the foregoing process (206) for a single image at this point, then an interactive user verification (208) is implemented. This verification will be further described in relation to FIG. 6. If verification is not sought, or once verification is completed, the process returns to the beginning (210) if more images are available; otherwise, a decision is made (212) as to whether the images should be further verified; if not, the process is done. If the images are to be further verified, a query is made (214) as to whether the images should be batched. If they are not batched, an interactive user verification (216) is performed until all images are processed (218). If the images are batched, a batch user verification process (220) is initiated. The user and batch verification processes are further explained in connection with FIGS. 6 and 7, respectively.

Figure 4:
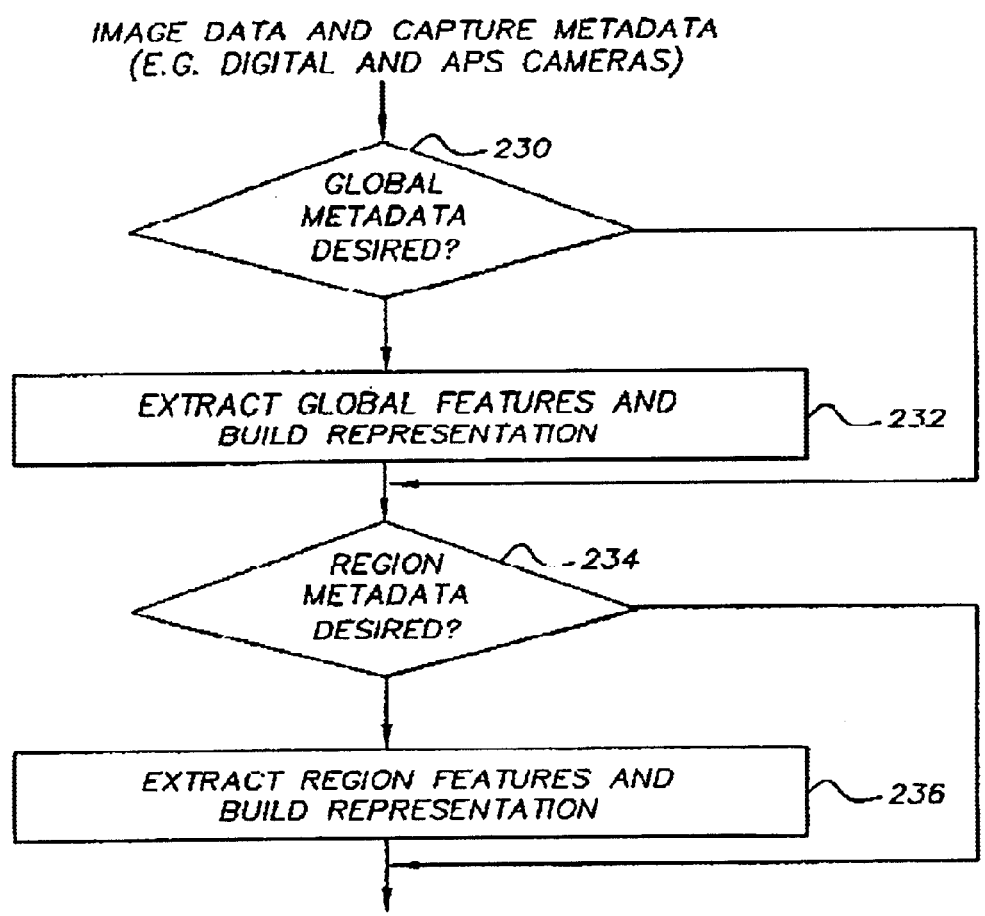
FIG. 4 is a flow chart of the method for building an image representation.

The image representation stage 202 is further described in FIG. 4. If global metadata is determined (230) to be desirable, then the global features are extracted (232) in order to build a global representation. As described earlier, the global features include without limitation color histograms, texture features, overall composition and the like. Then, if region metadata is determined (234) to be desirable, the region features are extracted (236) in order to build a region representation. As described earlier, the region features include without limitation face, skin, sky, grass, open space, and the like.

Figure 5:
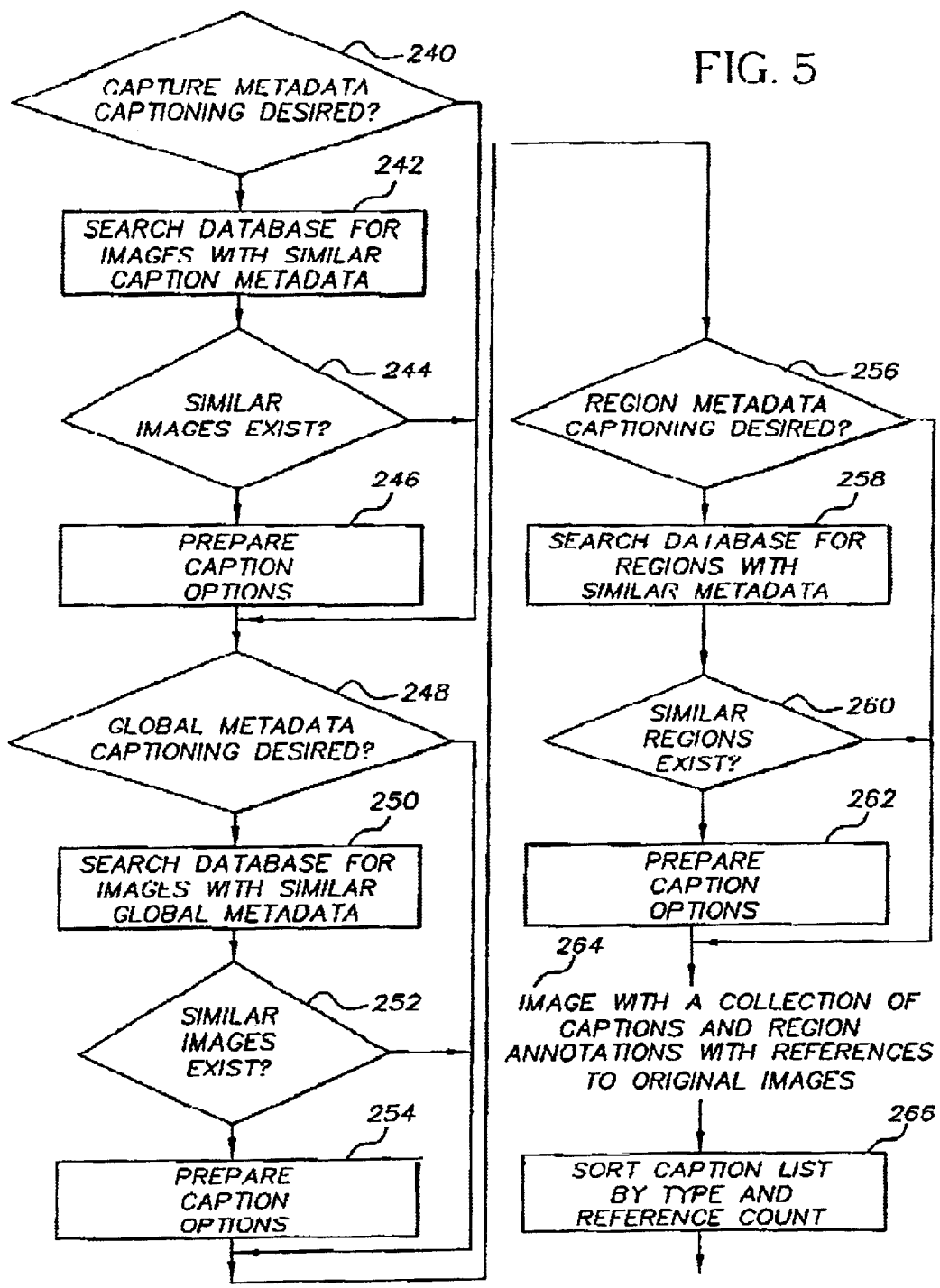
FIG. 5 is a flow chart of the method for retrieving similar images from a database and preparing caption options.

The image retrieval and caption or semantic label preparation stage 204 is further shown in FIG. 5. Basically, the retrieval and caption process is separated into three stages: one each for capture metadata, global metadata and region metadata. This way the process can be cut short at any point to provide the level of captioning or semantic labeling that is desired or required. If captioning or semantic labeling of the acquired images based on capture metadata is desired (240), the database is searched (242) for any image with caption metadata (e.g., time/date, GPS, user defined events) similar to that of the acquired images, and repeated as needed (244) until all acquired images are analyzed. Then the captions or semantic labels from the retrieved and matched images are prepared as options (246) for extension to the acquired images.

If captioning or semantic labeling of the acquired images based on global metadata is desired (248), the database is searched (250) for any images with global metadata (based on color histograms, texture, etc.) similar to that of the acquired images, and repeated as needed (252) until all acquired images are analyzed. Then the captions or semantic labels for the global aspects, e.g., content, of the retrieved and matched images are prepared as options (254) for extension to the acquired images. If captioning or semantic labeling of the acquired images based on region metadata is desired (256), the database is searched (258) for any images with region metadata (e.g., face, sky, grass, skin, open space, etc.) similar to that of the acquired images, and repeated as needed (260) for similar regions until all images are analyzed. Then the captions or semantic labels for the regional aspects of the retrieved and matched images are prepared as options (262) for extension to the acquired images. The result thus obtained (264) comprises one or more images with a collection of potential captions or semantic labels, and/or region annotations. Finally, the caption list or semantic label list, and/or regional annotation list, may be sorted (266) by type and by the reference count, thereby providing a user-friendly list of capture or semantic labels, and/or regional annotations, for each acquired image.

Figure 6:
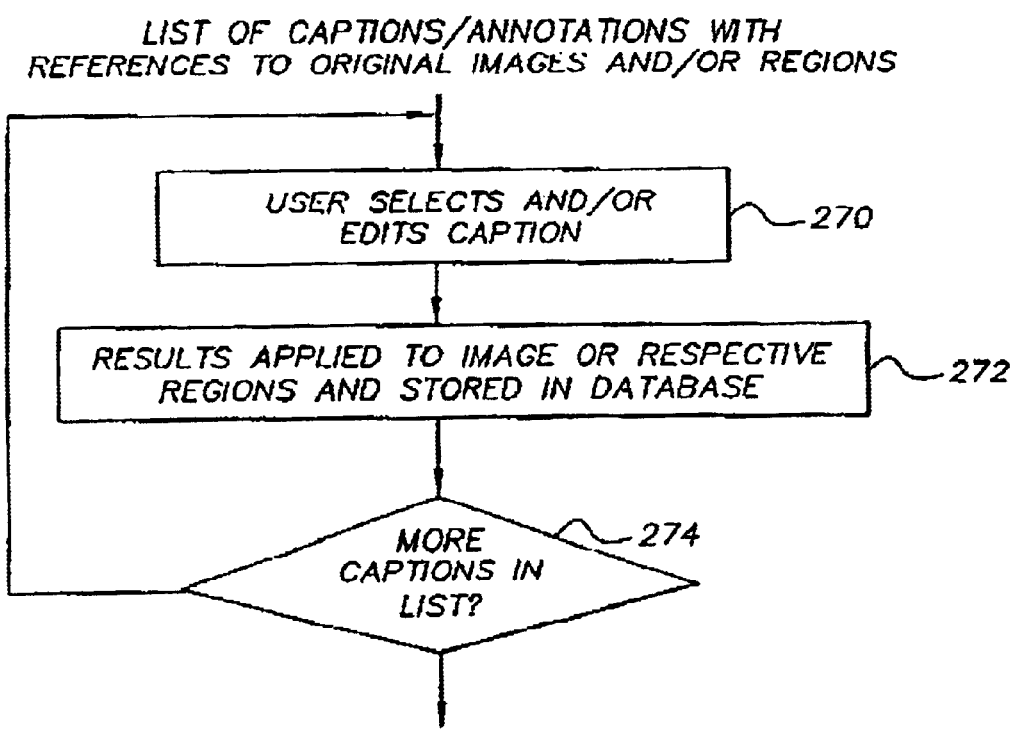
FIG. 6 is a flow chart of the method for interactive user verification.
Figure 7:
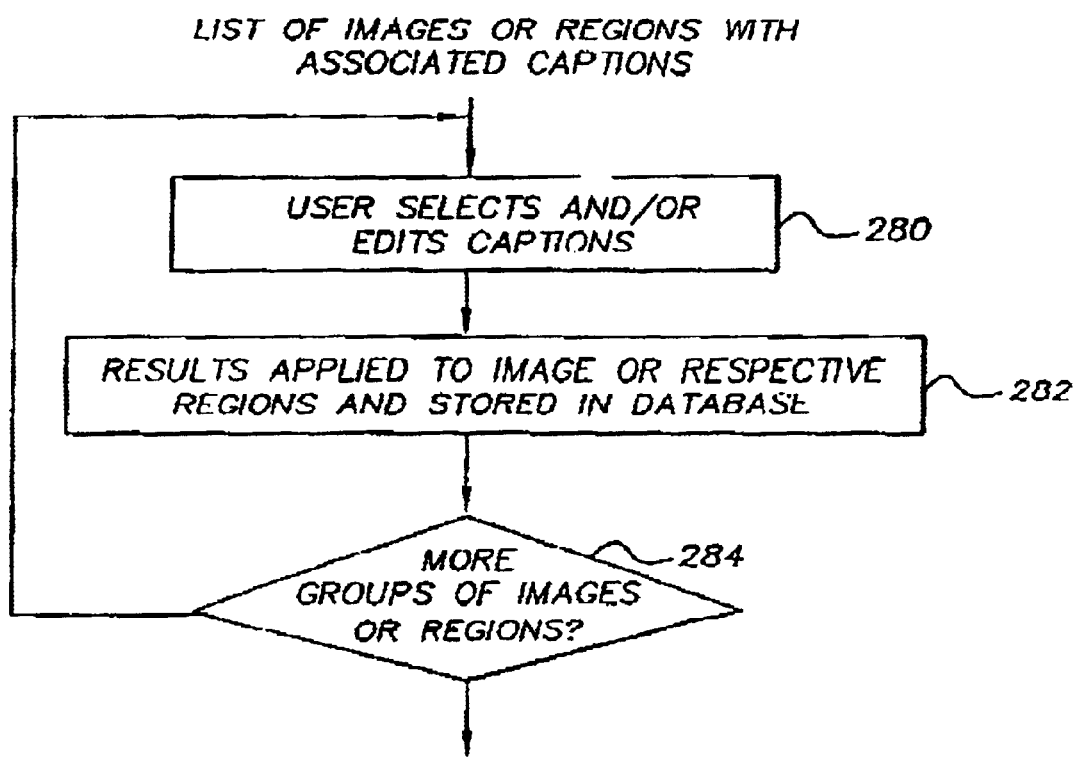
FIG. 7 is a flow chart of the method for batch user verification.

The interactive user verification stages 208 and 216 are further described in FIG. 6. Given the list of captions/annotations obtained in the caption sorting stage 266 with reference to the original, the list is presented to the user, e.g., on the display device 32, and the user may select and/or edit (270) the captions or labels. Once this user interface is completed, the results are applied (272) to the image (for capture and global metadata) or to respective regions (for region metadata) and stored in the database. Then the process is applied (274) to other images if additional captions or labels exist for more images. The batch user verification stage 220 is further described in FIG. 7. If the batch image process has been implemented (214), the captions that are sorted (266) will pertain to batches of images. The list appropriate for the whole batch is presented to the user, e.g., on the display device 32, and the user may select and/or edit (280) the group captions or labels. The results are then applied (282) to the group of image and the image groups are stored in the database. Then the process is applied (284) to other image groups if additional captions or labels exist for more groups.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | computer |
| 12 | large capacity memory |
| 14 | network interface |
| 16 | remote server |
| 18 | network |
| 20 | internal memory |
| 22 | input devices |
| 24 | memory card reader |
| 26 | network interface |
| 28 | voice recognition module |
| 30 | output devices |
| 32 | display device |
| 34 | printer |
| 36 | network interface |
| 38 | output device |
| 100 | image acquisition |
| 110 | metadata extraction |
| 120 | cluster/group images |
| 130 | determine similarities between cluster/groups |
| 140 | extend labels to new groups/clusters |
| 150 | present option of correction and labeling to user |
| 160 | add images to database |
| 200 | get image data and capture metadata |
| 202 | build image representation |
| 204 | image retrieval and caption preparation |
| 206 | verify single image decision |
| 208 | interactive user verification |
| 210 | decision regarding more images |
| 212 | decision regarding verification |
| 214 | decision regarding batch processing |
| 216 | interactive user verification |
| 218 | decision regarding more images |
| 220 | batch user verification |
| 230 | decision regarding global metadata |
| 232 | extract global features to build representation |
| 234 | decision regarding region metadata |
| 236 | extract region features to build representation |
| 240 | decision regarding capture metadata captions |
| 242 | search database |
| 244 | decision regarding more images |
| 246 | prepare caption options |
| 248 | decision regarding global metadata captions |
| 250 | search database |
| 252 | decision regarding more image |
| 254 | prepare caption options |
| 256 | decision regarding region metadata captions |
| 258 | search database |
| 260 | decision regarding similar regions |

-continued

PARTS LIST

| | |
|---|---|
| 262 | prepare caption options |
| 264 | resulting image with captions and region annotations |
| 266 | sort caption list |
| 270 | user selects and/or edits captions |
| 272 | results applied to image |
| 274 | decision regarding more images with captions |
| 280 | user selects and/or edits group captions |
| 282 | results applied to image group |
| 284 | decision regarding more groups of images with captions |

What is claimed is:

1. A method of generating one or more captions or semantic labels for an acquired image with limited user interaction, said method based upon similarity between the acquired image and one or more stored images that are maintained in an image database environment, wherein the stored images have preexisting captions or labels associated with them, said method comprising the steps of:
    a) acquiring an image for evaluation with respect to the stored images;
    b) automatically extracting metadata from the acquired image without requiring user interaction in the image database environment;
    c) automatically selecting one or more stored images having metadata similar to the extracted metadata, thereby providing one or more selected stored images with metadata similar to the acquired image: and
    d) automatically generating one or more captions or labels for the acquired image by automatically, without any user intervention, extending the captions or labels to the acquired image from one or more preexisting captions or labels associated with the selected stored images;
    wherein the stored images have one or more preexisting captions or labels associated with one or more regions of the stored images and wherein step b) automatically extracts metadata from the acquired image describing measurable image features that pertain to one or more regions of the acquired image; step c) provides selected stored images having metadata similar to the metadata extracted from the acquired image for corresponding regions; and step d) generates one or more captions or labels for the regions of the acquired image from the preexisting labels or captions associated with the regions of the selected stored images.

2. The method as claimed in claim 1 wherein the metadata is derived from objectively measurable low level features including at least one of color and texture.

3. The method as claimed in claim 1 wherein the metadata is derived from objectively measurable features that pertain to one or more regions of the acquired image including at least one of face, skin, sky, grass and open space.

4. The method as claimed in claim 1 wherein the metadata extracted in step b) includes data accompanying the acquired image that was obtained substantially at the time of capture.

5. The method as claimed in claim 4 wherein the data accompanying the acquired image includes at least one of time of capture, date of capture, location of the image and text or code entered at the time of capture.

6. The method as claimed in claim 1 wherein the metadata extracted in step b) describes measurable image features of the acquired image.

7. The method as claimed in claim 1 wherein step d) comprises providing said one or more of the automatically-extended captions or labels associated with the selected stored images for user verification or correction before using them as captions or labels for the acquired image.

8. The method as claimed in claim 1 wherein step d) comprises extending one or more of the preexisting captions or labels associated with the selected stored images as the caption or label for the acquired image.

9. A method of generating one or more captions or semantic labels for groups of acquired images with limited user interaction, said method based upon similarity between the acquired images and one or more stored images that are maintained in an image database environment, wherein the stored images have preexisting captions or labels associated with them, said method comprising the steps of:
    a) acquiring a plurality of images for evaluation with respect to the stored images;
    b) automatically extracting metadata from the acquired images without requiring user interaction in the image database environment;
    c) automatically clustering the acquired images into groups based upon similarities in their metadata, thereby resulting in grouped images with similar metadata;
    d) automatically selecting one or more stored images having metadata similar to the extracted metadata, thereby providing one or more selected stored images with metadata similar to the grouped images; and
    e) automatically generating one or more captions or labels for grouped images by automatically, without any user intervention, extending the captions or labels to the grouped images from one or more preexisting captions or labels associated with the selected stored images;
    wherein the stored images have one or more preexisting captions or labels associated with one or more regions of the stored images and wherein step b) automatically extracts metadata from the acquired images describing measurable image features that pertain to one or more regions of the acquired images; step d) provides selected stored images having metadata similar to the metadata extracted from the grouped images for corresponding regions; and step e) generates one or more captions or labels for the regions of the grouped images from the preexisting labels or captions associated with the regions of the selected stored images.

10. The method as claimed in claim 9 wherein the metadata extracted in step b) describes measurable image features of the acquired images.

11. The method as claimed in claim 10 wherein the metadata is derived from objectively measurable low level features including at least one of color and texture.

12. The method as claimed in claim 10 wherein the metadata is derived from objectively measurable features that pertain to one or more regions of the acquired image including at least one of face, skin, sky, grass and open space.

13. The method as claimed in claim 9 wherein the metadata extracted in step b) includes data accompanying the acquired image that was obtained substantially at the time of capture.

14. The method as claimed in claim 13 wherein the data accompanying the acquired images include at least one of time of capture, date of capture, location of the image and text or code entered at the time of capture.

15. The method as claimed in claim 9 wherein step e) further includes propagating the generated caption or label through all of the acquired images in the group.

16. The method as claimed in claim 9 wherein step e) comprises providing said one or more of the automatically-extended captions or labels associated with the selected stored images for user verification or correction before using them as captions or labels for the grouped images.

17. The method as claimed in claim 9 wherein step e) comprises extending one or more of the preexisting captions or labels associated with the selected stored images as the caption or label for the grouped images.

18. A method of generating one or more captions or semantic labels for an acquired image based upon similarity between the acquired image and one or more stored images that are maintained in an image database environment, wherein the stored images have preexisting captions or labels associated with them, said method comprising the steps of:
   a) acquiring an image for evaluation with respect to the stored images;
   b) processing the acquired image to extract metadata describing measurable features in the acquired image;
   c) automatically selecting one or more stored images having metadata similar to the extracted metadata, thereby providing one or more selected stored images with metadata similar to the acquired image; and
   d) automatically generating one or more captions or labels for the acquired image by automatically, without any user intervention, extending the captions or labels to the acquired image from one or more preexisting captions or labels associated with the selected stored images;
   wherein the stored images have one or more preexisting captions or labels associated with one or more regions of the stored images and wherein step b) automatically extracts metadata from the acquired image describing measurable image features that pertain to one or more regions of the acquired image; step c) provides selected stored images having metadata similar to the metadata extracted from the acquired image for corresponding regions; and step d) generates one or more captions or labels for the regions of the acquired image from the preexisting labels or captions associated with the regions of the selected stored images.

19. The method as claimed in claim 18 wherein the extracted metadata describes globally measurable features such as color or texture.

20. The method as claimed in claim 18 wherein the extracted metadata describes features measurable in a region of the acquired image such as faces, skin, sky, grass or open space.

21. The method as claimed in claim 20 wherein the captions or labels relate to the region of the acquired image.

22. A computer program product for generating one or more captions or semantic labels for an acquired image with limited user interaction based upon similarity between the acquired image and one or more stored images that are maintained in an image database environment, wherein the stored images have preexisting captions or labels associated with them, said computer program product comprising a computer readable storage medium having a computer program stored thereon for performing the steps of:
   a) automatically extracting metadata from the acquired image without requiring user interaction in the image database environment;
   b) automatically selecting one or more stored images having metadata similar to the extracted metadata, thereby providing one or more selected stored images with metadata similar to the acquired image; and
   c) automatically generating one or more captions or labels for the acquired image by automatically, without any user intervention, extending the captions or labels to the acquired image from one or more preexisting captions or labels associated with the selected stored images;
   wherein the stored images have one or more preexisting captions or labels associated with one or more regions of the stored images and wherein step a) automatically extracts metadata from the acquired image describing measurable image features that pertain to one or more regions of the acquired image; step b) provides selected stored images having metadata similar to the metadata extracted from the acquired image for corresponding regions; and step c) generates one or more captions or labels for the regions of the acquired image from the preexisting labels or captions associated with the regions of the selected stored images.

23. The computer program product as claimed in claim 22 wherein the metadata extracted in step a) includes data accompanying the acquired image that was obtained substantially at the time of capture.

24. The computer program product as claimed in claim 22 wherein the metadata extracted in step a) describes measurable image features of the acquired image.

25. The computer program product as claimed in claim 22 wherein step c) comprises providing said one or more of the automatically-extended captions or labels associated with the selected stored images for user verification or correction before using them as captions or labels for the acquired image.

26. The computer program product as claimed in claim 22 wherein step c) comprises extending one or more of the preexisting captions or labels associated with the selected stored images as the caption or label for the acquired image.

27. A computer program product for generating one or more captions or semantic labels for groups of acquired images with limited user interaction based upon similarity between the acquired images and one or more stored images that are maintained in an image database environment, wherein the stored images have preexisting captions or labels associated with them, said computer program product comprising a computer readable storage medium having a computer program stored thereon for performing the steps of:
   a) automatically extracting metadata from the acquired images without requiring user interaction in the image database environment;
   b) clustering the acquired images into groups based upon similarities in their metadata, thereby resulting in grouped images with similar metadata;
   c) automatically selecting one or more stored images having metadata similar to the extracted metadata, thereby providing one or more selected stored images with metadata similar to the grouped images; and
   d) automatically generating one or more captions or labels for grouped images by automatically, without any user intervention, extending the captions or labels to the grouped images from one or more preexisting captions or labels associated with the selected stored images;
   wherein the stored images have one or more preexisting captions or labels associated with one or more regions of the stored images and wherein step a) automatically extracts metadata from the acquired images describing measurable image features that pertain to one or more regions of the acquired images; step c) provides selected stored images having metadata similar to the metadata extracted from the grouped images for corresponding regions: and step d) generates one or more captions or labels for the regions of the grouped images from the preexisting labels or captions associated with the regions of the selected stored images.

28. The computer program product as claimed in claim 27 wherein step d) further includes propagating the generated caption or label through all of the acquired images in the group.

* * * * *